Aug. 25, 1959 F. STADELMAN 2,901,135
METHOD OF, AND APPARATUS FOR, DE-LIDDING AND
DE-PANNING BREAD LOAVES OR THE LIKE
Filed July 1, 1957 5 Sheets-Sheet 1

FIG. 1.

INVENTOR
FRANK STADELMAN
BY
ATTORNEY

Aug. 25, 1959 — F. STADELMAN — 2,901,135
METHOD OF, AND APPARATUS FOR, DE-LIDDING AND
DE-PANNING BREAD LOAVES OR THE LIKE

Filed July 1, 1957 — 5 Sheets-Sheet 3

INVENTOR.
FRANK STADELMAN
BY
Arthur N. Klein
ATTORNEY

Aug. 25, 1959  F. STADELMAN  2,901,135
METHOD OF, AND APPARATUS FOR, DE-LIDDING AND
DE-PANNING BREAD LOAVES OR THE LIKE
Filed July 1, 1957  5 Sheets-Sheet 4

INVENTOR
FRANK STADELMAN
BY Arthur N. Klein
ATTORNEY

United States Patent Office 2,901,135
Patented Aug. 25, 1959

2,901,135

METHOD OF, AND APPARATUS FOR, DE-LIDDING AND DE-PANNING BREAD LOAVES OR THE LIKE

Frank Stadelman, Cranford, N.J., assignor to Latendorf Conveying Corporation, Bayonne, N.J., a corporation of New Jersey Application July 1, 1957, Serial No. 668,961

11 Claims. (Cl. 214—308)

The present invention relates generally to material handling apparatus and more particularly to apparatus, for use in bakeries and the like, for de-lidding and de-panning baked bread.

In bakeries, bread is ordinarily baked in pan straps comprising a plurality of side-by-side pans for individual loaves; the individual pans being connected into a more or less unitary assembly. The pan strap is provided with a lid which covers all of the individual pans, and which is relatively heavy; the extra weight helping to maintain uniform loaf-size during baking.

After baking has been completed, the covered pan strap is removed from the oven, after which its lid must be removed and the individual loaves of bread must be taken out.

Due to the weight of the lid and the frequent tendency of the baked loaves to stick or adhere to the individual pans, manual de-lidding and de-panning (i.e. removal of the baked loaves from the pan strap) is a difficult and time-consuming operation.

Various machines have heretofore been suggested for de-panning (after manual de-lidding), but these previously known de-panning machines have all been extremely complicated and costly and, in addition, have been objectionable in that an excessively high proportion of the baked loaves are bruised or broken during the dumping which constitutes part of the de-panning operation.

In my application, Serial No. 559,205, filed January 16, 1956, now Patent No. 2,886,195, of which the present application is a continuation-in-part, I have disclosed a novel method of, and apparatus for, de-lidding and de-panning bread in a single continuous automatic operation wherein the tendency to bruise or break the dumped bread is appreciably reduced, and wherein other shortcomings of the prior art are eliminated.

According to the present invention, the novel method and apparatus of my aforesaid co-pending application Serial No. 559,205 are further improved so as to minimize wear and failure of the pan strap or bread pan during the de-panning operation without interfering with the effectiveness of the de-panning.

It is an object of the present invention to provide a new and improved method of, and apparatus for, automatically de-panning bread following the baking thereof. Another object of this invention is to provide a novel method of, and apparatus for, dumping a plurality of bread loaves from the pan or strap in which they have been baked, so as effectively to free the loaves from the pan, with minimum bruising or breaking of the bread, and at the same time somewhat retard and cushion the pan or strap during the dumping operation, thereby minimizing wear-and-tear and reducing the likelihood of pan failure.

Other objects and advantages of the present invention are apparent in the following detailed description, appended claims and accompanying drawings.

For the purpose of illustrating the invention, there is shown in the drawings one form thereof which has been found in practice to give satisfactory results and which is presently preferred. It is to be understood, however, that this invention is not limited to the disclosed species, and that the various parts, elements and operations can be differently arranged and organized without departing from the spirit or essential attributes of this invention.

Referring to the accompanying drawings in which like reference characters indicate like parts throughout.

Figure 1:
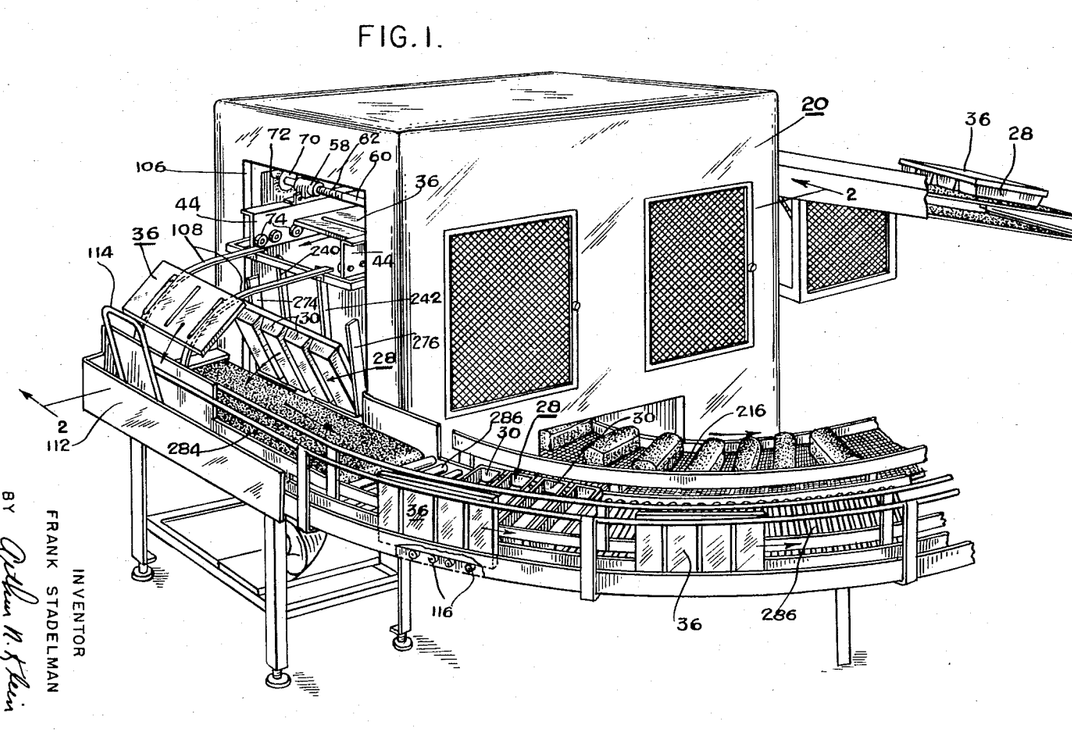
Figure 1 is a perspective view of an automatic de-lidding and de-panning machine wherein the present invention is embodied.
Figure 2:
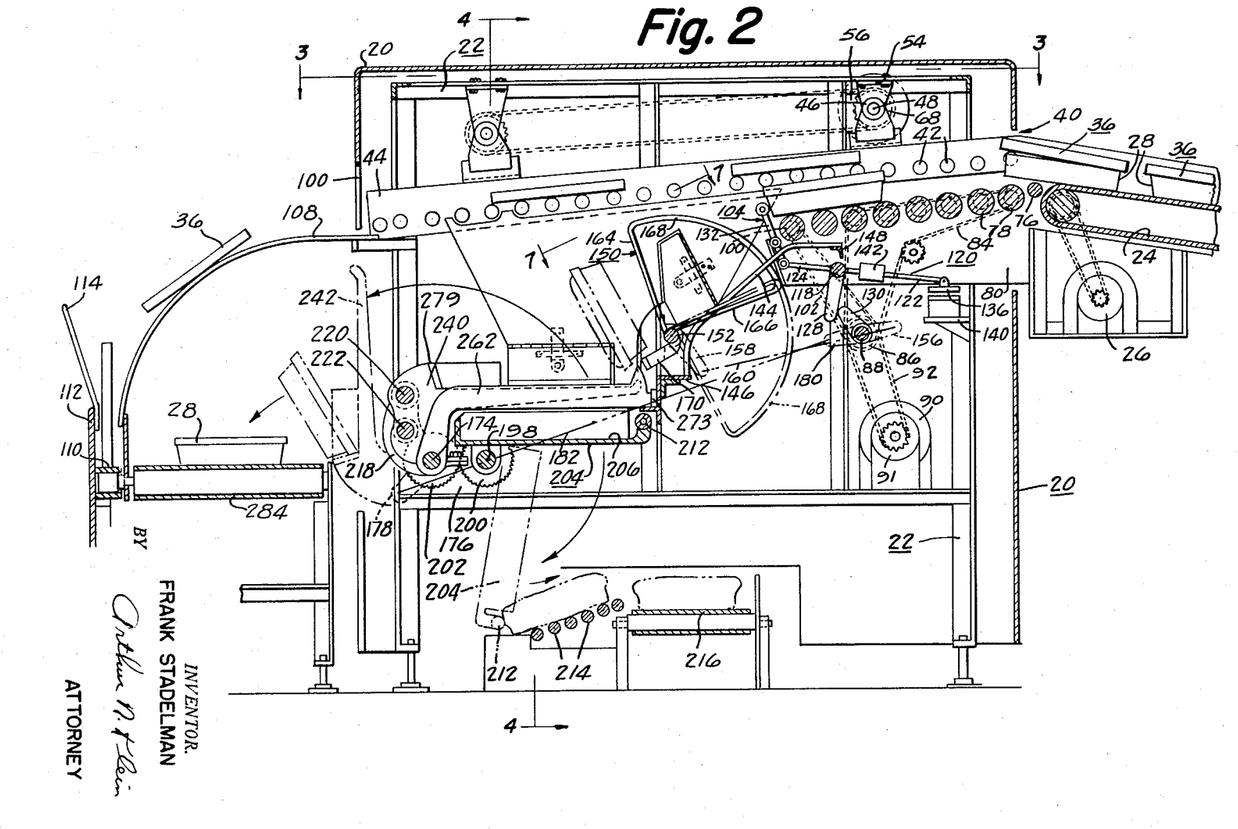
Figure 2 is a more or less schematic vertical longitudinal cross-sectional view taken generally along the line 2—2 of Fig. 1.

Shown generally in Figs. 1 and 2, is an automatic de-lidding and de-panning machine for pan straps containing baked bread loaves. Except as specifically distinguished hereinbelow, the machine of Figs. 1 and 2 is generally like that disclosed in my co-pending application Serial No. 559,205, which contains a more detailed description of the construction and mode of operation of those features which are common to both applications.

Thus, the machine of Figs. 1 and 2 includes a generally enclosed housing 20 surrounding a frame 22. An inclined conveyor belt, driven by a motor 26, serves to carry filled and lidded pans or pan straps 28 taken from the oven upward to the machine.

Figure 6:
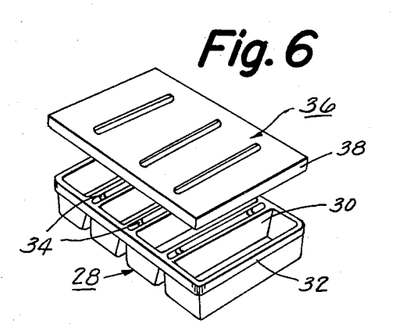
Figure 6 is a perspective view of a pan strap and its lid, the lid being shown in removed position.

As shown in Fig. 6, each pan strap 28 includes a plurality (for example four) of individual pan elements 30 (each intended to hold a single loaf of bread or the like) rigidly held in spaced side-by-side relationship by a rectangular frame element 32 and a plurality of transversely disposed spacer elements 34 which connect the adjoining parallel edges of adjacent pan elements 30. In Fig. 6, two longitudinally separated spacer elements 34 connect each adjoining pair of pan edges, making a total of six elements 34, although of course, this number can be varied. It is pointed out that, according to the present invention, these spacer elements 34 of the pan strap are no longer required to withstand the jar or shock of the de-panning operation.

The pan strap 28 is provided with a lid 36, having a peripheral flange 38 of substantial thickness which fits over and protrudes beyond the pan strap, as shown in Figs. 1 and 2.

Figure 3:
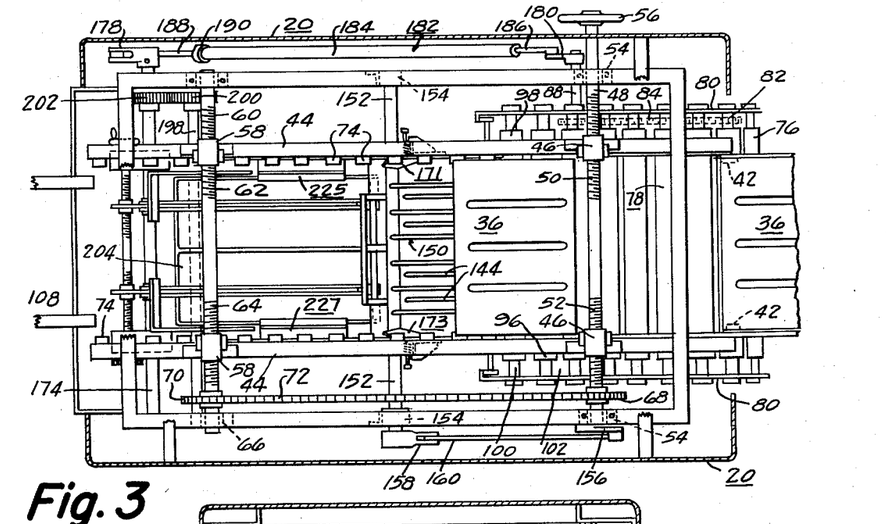
Figure 3 is a horizontal cross-sectional view taken generally along the line 3—3 of Fig. 2.

As shown in Fig. 2, each loaded and covered pan strap is moved in upwardly inclined position by the belt 24 until its forward end extends within an entrance opening 40 in the housing 20; the leading corners of the lid flange 38 riding over a pair of spaced roller wheels 42 mounted on the inner faces of longitudinally disposed downwardly inclined track members 44. In order to accommodate pan strap lids of different sizes, the track members 44 are made laterally adjustable, toward and away from each other. Thus, the members 44 are provided with aligned threaded collars 46 near their upper ends; the collars engaging oppositely threaded portions 50 and 52 of a transverse supporting shaft 48, which is rotatably mounted on the frame 22 by bushings 54. One end of shaft 48 protrudes from housing 20 and is provided with an adjusting wheel 56, as shown in Fig. 3. It can be seen that, by reason of the oppositely threaded shaft portions 50 and 52 and the correspondingly threaded collars 46, the track members 44 will be moved laterally toward each other when the wheel 56 is turned in one direction, and away from each other when the wheel is turned in the other direction.

The lower ends of the track members 44 are provided with threaded collars 58 and a shaft 60 having oppositely threaded portions 62 and 64 engaged by the collars; the ends of the shaft 60 being rotatably mounted on the frame 22 by bushings 66. The shafts 48 and 60 have longitudinally aligned sprocket wheels 68 and 70, connected by a sprocket chain 72, so that the shaft 60 moves with the shaft 48 upon rotation of the wheel 56, thereby maintaining the track members in parallel relationship as they move laterally toward or away from each other.

The track members 44 are provided with a series of aligned pairs of roller wheels 74 longitudinally spaced throughout substantially their entire length.

With the leading edges of the lid flange 38 riding over the first pair of roller wheels 42 as described, continued forward and upward movement of the pan strap upon the belt 24 causes the bottom of the pan strap to ride over a transverse idler roll 76 located slightly above the level of the upper end of the belt.

When more than half of the pan strap has passed beyond the idler roll 76, the force of gravity causes the pan strap to tilt about the underlying idler roll from an upwardly to a downwardly inclined position; the pan strap being thus deposited upon a plurality of transverse horizontal rollers 78 disposed below the level of the roller wheels 42 and 74.

The plurality (for example six) of rollers 78 have their ends rotatably mounted upon a pair of laterally spaced longitudinally extending supporting arms 80; successive rollers 78 being spaced to form a path which is forwardly and downwardly inclined at a somewhat steeper angle than that formed by the roller wheels 74.

As shown in Fig. 3, one end of each roller 78 is provided with a a sprocket gear 82; all of the gears 82 being engaged and rotated in the same direction by a sprocket chain 84 which, in turn, is driven by sprocket gear 86 mounted on a power shaft 88. A sprocket chain 92 and motor 90 rotate the power shaft 88, which extends transversely below the level of the rollers 78 and is rotatably mounted upon the frame by means of bushings 94.

A transverse idler roller 96 is mounted next to the lowermost power roller 78, while a transverse power driven roller 98 is mounted next to the idler roller 96; the rollers 96 and 98 being disposed in the same forwardly and downwardly inclined path as the rollers 78. The roller 98 is provided with a sprocket gear 100 (preferably located at the end opposite the gears 82), which is driven from the power shaft 88 by a separate sprocket chain 102, preferably at a higher speed than the rollers 78.

Figure 4:
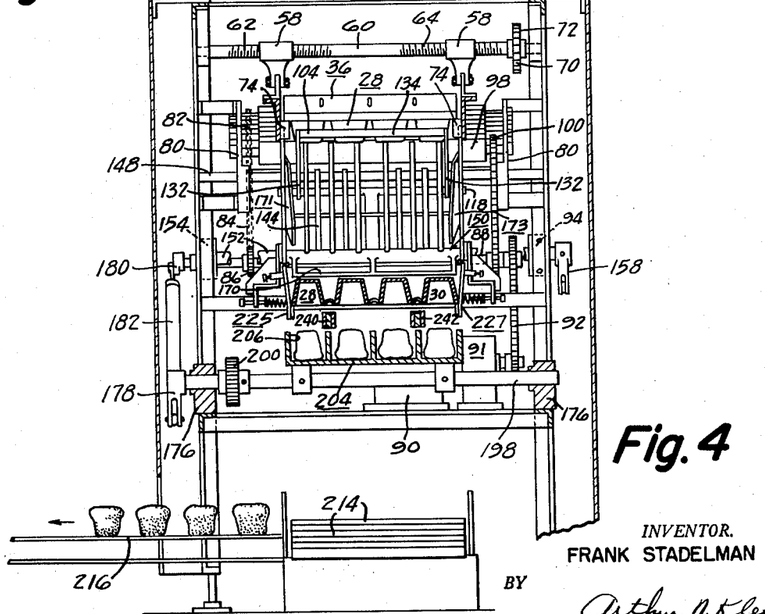
Figure 4 is a vertical cross-sectional view taken generally along the line 4—4 of Fig. 2.

The ends of the rollers 96 and 98 are also journalled upon the supporting arms 80, as shown in Figs. 3 and 4.

After the pan strap pivots about the idler roller 76 and falls upon the power rollers 78, it is moved forwardly and downwardly along successive rollers 78, the idler roller 96, and the power roller 98 until it strikes a pan stop 104. During this forward and downward movement of the pan stop, its lid 36, riding upon the roller wheels 42 and 74, also moves forwardly and downwardly, but at a lesser angle so that it is gradually lifted off the pan strap, whereupon it slides freely, by gravity, downwardly over successive pairs of roller wheels 74 until it emerges from an outlet opening 106 in the housing 20 and slides onto a pair of laterally spaced convexly curved straps 108 which enable the lid to fall edgewise onto a relatively narrow power driven conveyor belt 110 set between spaced upright supporting walls 112, as shown in Figs. 1 and 2. The outer of the two walls 112 may be provided with a guard 114 which guides the lid into position on the belt 110.

The conveyor belt 110 moves the lid, in edgewise position, onto a curved downwardly inclined path formed by a series of idler roller wheels, so that the lids leaving the machine are returned, by gravity, to a station (not shown) adjacent the oven for re-use.

The pan stop 104 mentioned above is best shown in Figs. 2 and 4 and includes a horizontal transverse rotatably mounted shaft 118 disposed somewhat below the idler roller 96; the shaft 118 supporting, and serving as a pivot for, a generally horizontal lever assembly 120. The lever assembly 120 includes a pair of laterally spaced generally parallel and horizontal arms 122, one of which is shown in Fig. 2; the front portion 124 of each arm 122 being somewhat shorter than the rear portion 126. Each arm 122 is provided with a generally vertical cam follower arm 128 which extends downwardly at right angles to the arm 122 from the pivot point.

The power shaft 88 is provided with a pair of cam arms 130 (one of which is shown in Fig. 2) which are in alignment with the cam follower arms 128.

Thus, as the power shaft 88 rotates (counterclockwise in Fig. 2), the cam arms 130 intermittently contact the cam follower arms 128 and cause opposite (i.e. clockwise in Fig. 2) pivotal movement of the cam follower arms and the lever assembly 120. After the cam arms 130 ride past the cam follower arms 128, the lever assembly returns to counterclockwise-rotated position by gravity as will be described.

A pair of laterally spaced generally vertically upwardly extending arms 132 (of which one is shown in Fig. 2) are mounted at the forward ends of the front lever arm portions 124; the upper ends of said arms 132 carrying a horizontal transverse pan stop rod 134. As shown in Fig. 2, when the lever assembly 120 is in clockwise-rotated position, the pan stop rod 134 is elevated to a level somewhat above that of the power roller 98 so as to halt forward movement of the pan strap 28 with the leading edge of the pan strap protruding slightly beyond said roller 98. However, when the lever assembly 120 is in counterclockwise-rotated position, the pan stop rod 134 is lowered to a level below that of the power roller 98 so as to free the pan strap 28 for further forward and downward inclined movement, as will be described.

A generally horizontal transverse iron rod 136 is mounted at the rearmost ends of the rear lever arm portions 126. When the lever arm assembly 120 is moved to the clockwise-rotated position of Fig. 2, the iron rod 136 is brought into contact with a pair of magnets 138 (of which one is shown in Fig. 2) mounted on a shelf 140 forming part of the frame 22. The magnets serve as dampers to minimize any tendency of the pan stop assembly to jiggle or bounce when elevated to pan-arresting position.

The rear lever arm portions 126 may be provided with partial counterweights 142; the lever assembly still being weighted so as to rotate counterclockwise when the arms 130 ride past the arms 128. This tendency to rotate counterclockwise is sufficiently great to overcome the pull of the magnets 138 so that, after the arms 130 ride beyond the arms 128 as mentioned above, the lever assembly 120 frees itself from the pull of the magnets and moves, by gravity, to counterclockwise-rotated position.

As the pan stop 104 is retracted from the pan-arresting position shown in Fig. 2, the pan strap 28 is free to be moved forward by the power roll 98 and is deposited upon a bed formed by a plurality (for example four)

of laterally spaced, forwardly and downwardly inclined, stationary rods 144, supported at their lower and upper ends by frame shelf members 146 and 148 respectively.

The pan strap 28 is adapted to be lifted from the bed rods 144 by a turn-over mechanism 150, shown in Figs. 2, 3, 4 and 7, which includes a transverse horizontal shaft 152 rotatably mounted on the frame 22 by bushings 154 and constructed and arranged to be reciprocably rotated from the power shaft 88 through a crank arm 158 (mounted at the corresponding end of shaft 152) and a connecting rod 160, as best shown in Fig. 3.

Mounted upon the shaft 152 are a plurality (for example six) of laterally spaced generally sector-shaped members 162 disposed in intermeshing relationship with the stationary bed rods 144. Each member 162 may be formed from a single rod which is bent to provide straight generally radial portions 164 and 166 connected by an outermost convex arcuate portion 168.

The mechanism 150 also includes a transverse stop shoulder 170 mounted on the opposite side of the shaft 152 from the members 162. When the mechanism 150 is in its clockwise-rotated position (shown in dash-dot lines in Fig. 2), the members 162 are disposed below the level of the stationary bed rods 144 so that the pan strap 28 is deposited upon the bed rods and slides downward therealong until its forward edge contacts stop shoulder 170.

According to the present invention, I provide retarder or check flaps 171 and 173 to slow down the movement of the pan strap 28 along the forwardly and downwardly inclined bed rods 144 and thereby to minimize the impact of the pan strap with the stop shoulder and to reduce the tendency of the freshly baked bread loaves to bruise or break as a result of excessively great impact force. The check flaps 171 and 173 are mounted upon vertical side plates 175 and 177 of the frame 22, as shown in Figs. 2, 3, 4 and 7. Since the flaps 171 and 173 are the same except that they are "mirror images" of each other (that is, the flap 171 extends inward from the left side plate 175 in Fig. 7, while the flap 173 extends inward from the right side plate 177 in Fig. 7), only the flap 171 will be described, it being understood that the description is equally applicable to flap 173.

Figure 5:
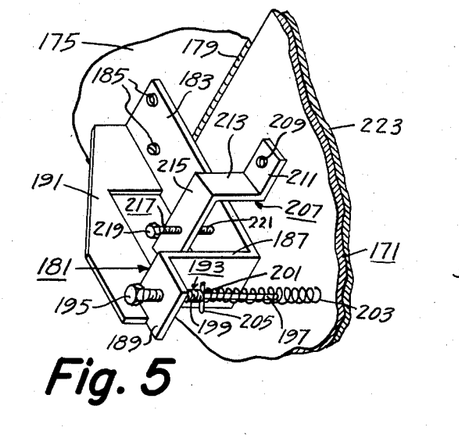
Figure 5 is an enlarged fragmentary perspective view of one of the spring-tensioned check flaps.

The flap 171 is fastened to the side plate 175 by a piano hinge 179 which, as best shown in Fig. 2, is forwardly and upwardly inclined so as to be more or less perpendicular to the stationary bed rods 144 and to extend upward therefrom; the hinge 179 being located appreciably forward of the shaft 152. As best shown in Figs. 2 and 5, the side plate 175 is provided with a recess having a shape corresponding to that of the flap 171, to permit the hinged flap to be swung either to inwardly-inclined checking position or to relatively retracted position wherein the flap is disposed more or less in the plane of the plate 175.

Figure 7:
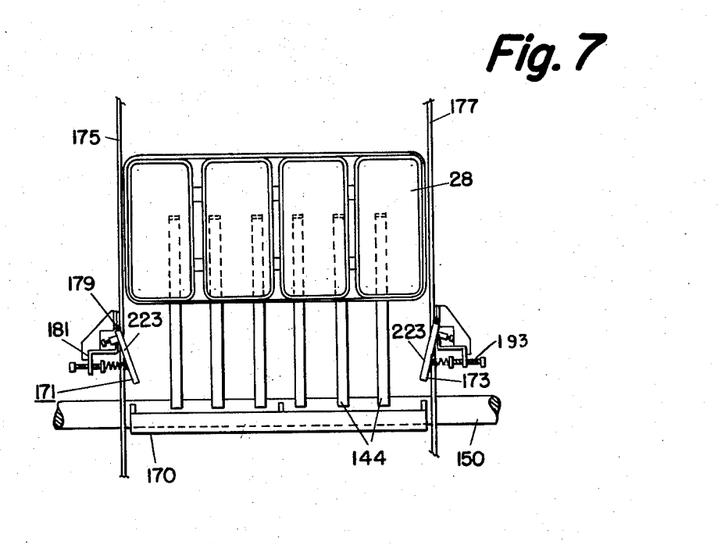
Figure 7 is a more or less schematic top view, looking in the direction of the arrows 7—7 of Fig. 2 showing the pan strap sliding toward the check flaps or retarder flaps.

As indicated in Figs. 2, 5 and 7, a more or less Z-shaped bracket 181 is provided for the check flap 171. The bracket 181 has one end portion 183 which is fastened to the outside of the side plate 175 in any suitable manner, for example by bolts 185. The bracket portion 183 is parallel to the side plate 175 and extends across the piano hinge 179 generally perpendicularly thereto.

The bracket 181 also has an integrally formed intermediate portion 187 which is bent so as to extend laterally outwardly generally at right angles to the fastened end portion 183. The intermediate portion 187 terminates in an integrally formed free end portion 189 which is bent so that it is generally at right angles to the intermediate portion and parallel to the other end portion 183, but extends oppositely from the intermediate portion 187, as best shown in Fig. 5.

The bracket 181 is provided with a gusset plate 191 connecting the end portions 183 and 189 to provide greater rigidity and support for the free end portion 189 which, as best shown in Figs. 5 and 7, is disposed in a plane generally parallel to, but spaced laterally outwardly from, the side plate 175.

The bracket end portion 189 is provided with a screw-threaded opening through which extends a screw-threaded adjusting pin 193 having a polygonal head 195 at its outer end and a reduced-diameter end portion 197 co-axial with and extending inward from the threaded stem 199; an annular shoulder 201 being thereby formed at the inner end of the stem 199. One end of a compression coil spring 203 fits over the end portion 197 and is seated against the annular shoulder 201. If desired, a more positive connection may be provided between the spring 203 and the adjusting pin 193; for example by drilling a diametric hole through the stem or the reduced-diameter end portion and inserting a locking pin 205 whose ends protrude radially outwardly and engage the turns of the spring 203. The other end of the spring 203 bears against the outer face of the check flap 171 and urges it to inwardly rotated position. By tightening or loosening the adjusting pin 193, it is possible to vary the degree of compression of the spring 203 and hence the degree of resilient pressure exerted inwardly upon the check flap by the spring.

As best shown in Fig. 5, a generally U-shaped yoke 207 is mounted upon the outer face of the check flap 171 by screws 209 passing through holes in the flanges 211 formed at the free ends of the parallel arms 213 of the yoke; the base or intermediate arm 215 of the yoke being disposed in bridging spaced relationship to the bracket end portion 183. A limit adjusting pin 217 is screw-threadedly mounted on the yoke bridging arm 215; the gusset plate 191 being notched out to accommodate the polygonal head 219 of the limit pin. The extent of spring-urged inward pivotal movement of the check flap is determined by the point at which the free end of the screw-threaded stem 221 of the limit pin 217 contacts the bracket end portion 183. By screwing the limit pin 217 inward toward the bracket end portion 183, the extent of spring-urged inward pivotal movement of the check flap is reduced. Conversely, outward adjustment of the limit pin 217 increases the extent of spring-urged inward pivotal movement of the check flap.

This adjustment not only serves to accommodate pan straps of different transverse dimensions but also varies the extent of the checking action of the opposed check flaps. Thus, if the check flaps are positioned relatively further inwardly, by adjustment of the limit pin 217 of each flap, the downwardly-sliding pan strap will have to move the check flaps further outwardly to get by and hence will be correspondingly further slowed down. Thus, the limit pin supplements the pressure adjusting pin 193 in determining the extent of resilient checking action exerted upon the sliding pan strap by the opposed check flaps.

A face plate 223 is removably mounted on the inner face of each of the check flaps 171 and 173, for example by countersunk screws. The face plate 223 is of a material softer than the metal of the pan strap so that it will wear, instead of the metal of the pan strap; thereby extending the useful life of the pan strap. The face plate 223 can be of synthetic resin, for example Micarta or Bakelite, which is relatively inexpensive to replace when worn.

Since the left and right check flaps 171 and 173 are "mirror images" of each other, both surfaces or faces of each face plate 223 can be used. Thus, after the exposed surface or face of the two plates 223 on the flaps 171 and 173 have become unduly worn by repeated contact with the metal of the pan straps, the face plate 223 is removed from the left check flap 171 and mounted on the right check flap 173 so that the worn face is in contact with the check flap 173; the mirror-image relationship providing an exact fit of the face plate on the check flap. In the same manner, the face plate from the check flap 173 is removed and mounted on the check flap 171 so that its worn face is turned away and is in contact with the face of the check flap. In this way, two new faces are presented for contact with the pan straps, reducing the number of replacements needed by half.

After the pan strap 28 has been slowed and halted, as described above, with its forward edge contacting the stop shoulder 170, the turn-over mechanism 150 rotates about 90 degrees counterclockwise in Fig. 2 to the position shown in solid lines. During this rotation, the radial portions 164 of the sector-shaped members 162 contact the bottom of the pan strap, raise the pan strap from the bed rods 144, and turn it over so that the pan strap 28 falls, in upside down position, upon left and right knockout flaps 225 and 227, shown in Figs. 2, 3, 4, 8 and 9, which are mounted on the side plates 175 and 177. Since the flaps 225 and 227 are mirror images of each other, only the flap 225 will be described; the description being equally applicable to flap 227.

The flap 225 is fastened to side plate 175 by a piano hinge 229 which is generally horizontal and extends across the top edge of the flap; the plate 175 being provided with a recess corresponding in shape to the flap, so that the flap 225 can be swung either to inwardly-inclined position or to relatively retracted position wherein it is more or less in the plane of the plate, as with the check flap 171 described above.

The knockout flap 225 is provided with a bracket 181 like the one described hereinabove and having a pressure adjusting pin 193 and spring 203. The flap 225 is also provided with a yoke 207 and limit adjusting pin 217 like those described above; whereby the extent of inward movement and the degree of spring pressure can be varied. A face plate 229 of synthetic resin or the like is removably mounted (for example by countersunk screws) on the main upper portion of the inner surface of the flap 225 in a manner similar to that described above in connection with face plate 229. The face plate 229 acts as a retarder to slow down the rate of fall of the inverted bread pan; the opposed plates 229 of the two flaps 225 and 227 being contacted by the metal bread pan frame and, being softer than the metal, wearing in preference thereto. The face plate 229 can be removed and refastened to the flap with its worn face covered to double the life of each face plate. However, since the face plate 229 is preferably of rectangular or other symmetrical configuration, it can be turned around on the same flap (without requiring transfer to the opposite flap as described in connection with the flaps 171 and 173).

Figure 8:
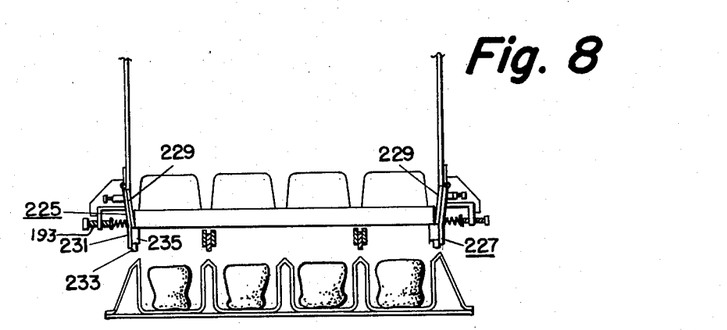
Figure 8 is a transverse cross-sectional view through the knock-out flaps and the bread catcher showing the pan strap in inverted dumped position and the bread loaves in upside down position within the bread catcher.
Figure 9:
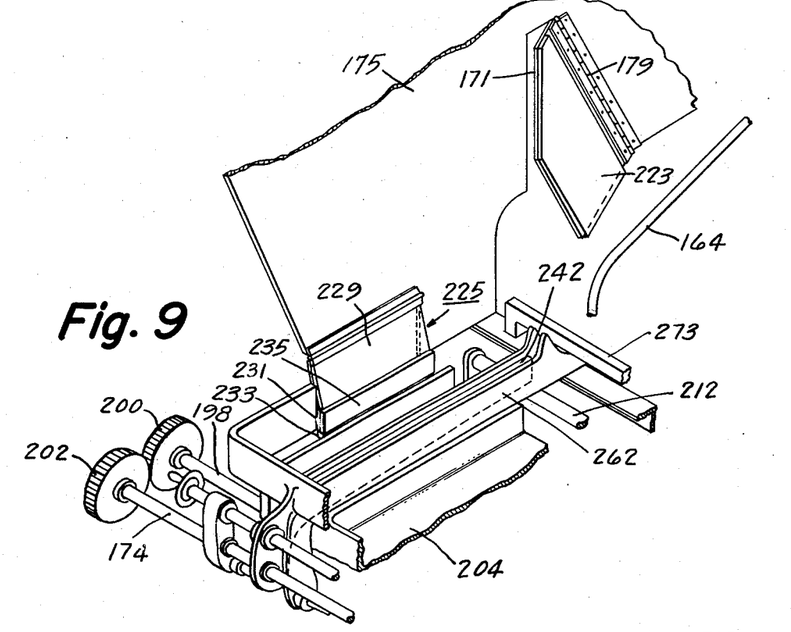
Figure 9 is an enlarged schematic perspective view showing the relative positions of the retarder and knock-out flaps.

The knockout flap 225 is provided with a lowermost edge portion 231 which is at an obtuse angle to the main upper portion of the flap so that, as best shown in Figs. 8 and 9, when the main upper portion of the flap is in downwardly and inwardly inclined position, the lowermost edge portion 231 is in less inclined (i.e., more nearly vertical) position. An inwardly directed shoulder 233 is formed along the bottom of the lowermost edge portion 231.

A knockout bar 235, of synthetic resin or the like, is removably fastened (for example by countersunk screws) to the inner face of the lowermost edge portion 231 so that it is also supported from beneath by the shoulder 233. The knockout bar 235 is approximately twice as thick as the retarder face plate 229 so that it protrudes inward appreciably therebeyond.

The upper inner edge of the knockout bar (which is of rectangular cross-section) thus provides a shoulder for the side of the frame element 32 of the inverted pan strap 28, as it falls from the turn-over mechanism 150. However, before striking the knockout bars 235 of the two opposed knockout flaps 225 and 227, the sides of the pan strap frame element 32 first contact the downwardly and inwardly inclined retarder face plates 229 of the inwardly spring-urged knockout flaps. The force required to force the knockout flaps outwardly against spring pressure slows the falling pan strap 28 and reduces the shock of impact with the knockout bars. This retarding or cushioning action of the knockout flaps, plus the fact that the face plates 229 and knockout bars 235 are of softer material than the metal of the pan strap, greatly reduces bread pan failure, as well as minimizing any tendency of breaking or crumbling of the bread loaves due to excessive impact force during de-panning.

Pan strap failure is further minimized by reason of the fact that the entire force of the de-panning impact is taken by the relatively strong pan strap frame element 32; the relatively weaker pan strap spacer elements 34 no longer being required to take up the de-panning impact as was the case in my co-pending application Serial No. 559,205 mentioned above.

Each knockout bar 235 can be removed and replaced in four different positions so as to provide four separate shoulders to compensate for wear of the synthetic resin material. Thus, as the original upper and inner edge wears away, the bar 235 is removed and replaced so that its other upper edge is innermost. When this wears away, the bar is inverted to bring the lower edges to the top, whereupon the two new upper edges can be used in sequence. Of course, the countersunk fastening screws for the knockout bar are symmetrically placed to enable the bar to be fastened in any of the four positions.

While its impact with the knockout bars 235 is cushioned as described above, the inverted pan strap 28 nevertheless strike the bars 235 with sufficient force to dislodge the baked bread loaves from the individual pan elements 30 (the vertical walls of which are preferably downwardly and inwardly tapered to facilitate dumping), so that the loaves fall, still in upside-down position, into a bread catcher 204 having a plurality of individual elongated open-top side-by-side compartments 206; the bread catcher being disposed below the knockout flaps.

The bread catcher 204 is mounted at its forward end upon a horizontal transverse shaft 198 whose ends are rotatably supported upon left and right frame members 176. The shaft 198 carries a toothed gear 200 which meshes with a slightly larger aligned gear 202 mounted on a shaft 174 which is disposed parallel to shaft 198 with its ends also rotatably supported upon frame members 176, as best shown in Figs. 3 and 4.

The shaft 174 is reciprocably rotated from power shaft 88 by mechanism which includes aligned crank arms 178 and 180 mounted at corresponding ends of shafts 174 and 88 respectively, and a connecting rod assembly 182, as shown in Figs. 3 and 4. The connecting rod assembly 182 incorporates lost-motion mechanism which permits a delayed "dwell" of shaft 174 in a specified position. This lost-motion mechanism is more fully described in my co-pending application Serial No. 559,205 and includes a cylinder 184 and a spring-urged piston (not shown) contained within the cylinder. An extension 186 connects the cylinder 184 with crank arm 180, while connecting rod 188 leads from the piston to crank arm 178.

As shaft 174 is reciprocably rotated from the power shaft 88, the meshing gears 200 and 202 cause the shaft 198 to rotate oppositely and (because of the smaller size of gear 200) through a somewhat larger arc.

As a result of the reciprocating rotation of shaft 198, the bread catcher 204 oscillates between an uppermost generally horizontal bread-receiving position and a lowermost generally vertical bread-dumping position. The bread-receiving position is shown in Figs. 4 and 8 and also in solid lines in Fig. 2. The vertical bread-dumping position is shown in dash-dot lines in Fig. 2.

As indicated in Fig. 2, the bread catcher oscillates through slightly more than 90 degrees so that, in its lowermost position, it is swung slightly beyond a true vertical line. A horizontal bumper bar 212 extends transversely across the rear open end of the bread catcher 204. Thus, when the bread catcher is swung beyond the true vertical line, the individual bread loaves are free to tilt, under the attraction of gravity, about the bumper bar 212, and to fall rightside-up upon a series of transversely extending generally horizontal idler rollers 214 which are disposed in a rearwardly and upwardly inclined path leading to a power driven conveyor belt 216.

Upon upward return movement of the bread catcher 204 (i.e. counterclockwise in Fig. 2), the bumper bar 212 sweeps in an arc behind the bread loaves (which are disposed in rightside-up side-by-side position upon the rollers 214) and gently pushes the loaves up along the path of the rollers 214 and onto the conveyor belt 216, which then removes the loaves, as shown in Figs. 1, 2 and 4; carrying them to any conventional wrapping machine (not shown).

Mounted upon the main shaft 174 are a pair of side-by-side laterally adjustable units which operate to raise the empty pan strap 28 from the knockout flaps 225 and 227, to re-invert the empty pan strap, and to deposit it, in rightside-up position, upon a take-off conveyor.

These laterally adjustable units include left and right supporting members 218 mounted on the shaft 174 and keyed for rotation therewith. The members 218 are curved so that, in the position shown in solid lines in Fig. 2, the main portions of said members extend more or less vertically upward and are displaced slightly forward of the shaft 174.

Upper and lower transverse horizontal shafts 220 and 222 respectively have their ends journalled within the main portions of the supporting members 218.

As more fully explained in my co-pending application Serial No. 559,205, the shafts 220 and 222 are both provided with oppositely screw-threaded portions and are connected by gears and a sprocket chain so that manual rotation of an adjusting wheel mounted on one of the shafts causes both shafts to rotate together at the same speed and in the same direction. Laterally spaced lift arms 240 and 242 are mounted on the oppositely threaded portions of the shafts 220 and 222 by means of correspondingly threaded sleeves so that rotation of the shafts 220 and 222 in one direction causes the lift arms 240 and 242 to move laterally along the shafts toward each other, while opposite rotation of the shafts causes the lift arms to move laterally away from each other.

Loosely journalled upon main shaft 174 are left and right finger guide assemblies 252 and 254 which are free to move axially along the shaft; the shaft being free to rotate relative thereto. As indicated in Figs. 2 and 4, each of the assemblies 252 and 254 extends upward from the shaft 174 and is curved to extend generally horizontally and rearwardly across the top of the bread catcher 204 but below the level of the knockout bars 235; the horizontally extending portions being bifurcated to provide laterally spaced arm portions 262 and 266 respectively.

The free ends of the assemblies 252 and 254 rest slidably upon a transverse supporting track 272 forming part of the frame 22 and are held thereon by a retaining yoke 273.

The lift arms or fingers 240 and 242 fit within the bifurcated portions of the assemblies 252 and 254. As indicated in Figs. 2, 4 and 8, the horizontal portions of the lift arms or fingers 240 and 242, when in lowermost horizontal position, are fully enclosed and recessed within the laterally spaced arm portions 262 and 266 respectively.

Since the assemblies 252 and 254 are free to move slidably along shaft 174 as described above, it is apparent that movement of the arms 240 and 242 toward or away from each other causes corresponding movement of the assemblies 252 and 254 within which they are disposed. It can be seen, therefore, that the lift arms 240 and 242 and the assemblies 252 and 254 can be adjusted simultaneously toward and away from each other to accommodate pan straps of different sizes. As indicated in Figs. 4 and 8, the lift arms or fingers 240 and 242 and the enclosing arm portions 262 and 266 should be set so that they are directly the partition walls of the bread catcher 204, in order not to interfere with the falling of the loaves from the pan strap 28 into the compartments of the bread catcher.

After the pan strap 28 has been deposited upside-down upon the knockout bars 235 with sufficient force to cause the bread loaves to drop out and into the bread catcher 204, as indicated in Figs. 2, 4 and 8, the lift arms 240 and 242 swing upward (counterclockwise in Fig. 2) from their lowermost horizontal position to the vertical position shown in dash-dot lines in Fig. 2 and, by contacting the pan strap frame 32 and spacer elements 34, raise the upside-down pan strap 28 from the knockout flaps 225 (upon which it was securely held by the gripping action of the spring-urged flaps).

Upstanding shoulders 279 are provided near the forward pivoted ends of the lift arms 240 and 242 and, as the arms tilt upward, the pan strap 28 slides forward and downward until it is halted by the shoulders 279. Continued upward tilting of the lift arms 240 and 242 causes the forward edge of the pan strap to pivot about the shoulders 279; the pan strap falling by gravity (counterclockwise in Fig. 2 as indicated in dash-dot lines) off the now-vertical lift arms and dropping, in rightside-up position, upon a take-off conveyor belt 284 which, as shown in Figs. 1 and 2, moves the empty pan strap to a downwardly inclined curved flight of idler rollers 286, along which the empty pan straps then move to a station (not shown) for re-use.

As mentioned above, until raised by the arms 240 and 242, the inverted pan strap is frictionally engaged by the spring-urged knockout flaps 225 and 227 so as to prevent longitudinal movement of the pan strap such as would otherwise occur as a result of the action of the turn-over mechanism 150. As shown in Fig. 2, the knockout flaps 225 and 227 are located relatively nearer the free open end of the bread catcher 204, so that the bread loaves drop into the bread catcher compartments relatively close to the bumper bar 212. As a result, the bread loaves have a shorter distance to fall when the bread catcher drops downward; thereby minimizing the possibility of bruising or breaking of the loaves druing the dumping operation of the bread catcher.

After the re-inverting operation described above, the arms 240 and 242 tilt back (clockwise in Fig. 2) to their original horizontal position until the next pan strap depositing operation of the turn-over mechanism 150. Contact with the assemblies 252 and 254 halts downward movement of the lift arms and also halts rotation of the shafts 174 and 198; the lost motion operation of connecting rod assembly 182 making possible this halt in the rotation of the shafts and the dwell of the lift arms.

By reason of the engagement of the gears 200 and 202, the shafts 174 and 198 rotate together but oppositely (the shaft 198 swinging through a slightly larger arc by reason of the smaller size of its gear 200. As indicated in Fig. 2, the shafts are so connected that when the lift arms 240 and 242 are in raised vertical position the bread catcher 204 is in lowered vertical dumping position (shown in dash-dot lines) and the arms and bread catcher return to generally horizontal adjoining position (shown in solid lines) at more or less the same time. The lost motion operation of the connecting rod assembly 182 enables the temporary halting of the bread catcher as well as the lift arms in the horizontal position, during the period in which the turn-over mechanism operates to deposit a filled pan strap 28 upon the knockout flaps 225 and 227 in upside-down position.

In the extremely unlikely contingency that the knockout-flaps 225 and 227 should fail, the filled pan strap would be deposited, in upside position, by the turnover mechanism upon the guide assemblies 252 and 254 in such position that the pan strap spacer elements 32 would strike the arm portions 262 and 266; the arm portions then serving as knockout bars to jar the loaves loose from the pan strap in the same manner as described in my co-pending application Serial No. 559,205.

A variable-speed transmission unit 91, of conventional construction, may be positioned between the motor 90 and the sprocket chain 92 driving the power shaft 88, as shown in Fig. 2. In this way, the speed of operation of the entire de-lidding and de-panning machine can be varied. Due to the simplicity of construction and the direct drive mechanism employed, a relatively high speed of operation is possible. Thus 30 to 40 pan straps (containing 120 or more baked bread loaves) can be handled easily.

The manner of operation of the de-lidding and de-panning mechanism is believed to be obvious from the foregoing description, although a more detailed disclosure is contained in my co-pending application Serial No. 559,205 referred to above, and the further description given below will be directed specifically to the operation of the check flap and knockout-flap mechanism.

Thus, it is believed adequate briefly to outline the preliminary operations, namely, the movement of the filled lidded pan strap 28 up along the feed belt 24; its pivotation about idler roller 74; the engagement of the pan lid flange 38 by the roller wheels 42; the gradual relative upward shifting of the pan lid by the series of roller wheels as the pan strap itself moves downward upon the more-steeply arranged power-driven rollers until the lid is clear of the pan strap and is then free to slide forwardly and downwardly along the roller wheels, by gravity, beyond the pan strap over the curved straps 108 and edgewise onto the conveyor take-off belt 110; the temporary halting of the de-lidded pan strap by the raised rod 134 of the pan stop 104; and the subsequent lowering of the pan stop 104 and of the members 162 of the turnover mechanism 150, freeing the pan strap for forward and downward movement by the power roller 98, until it slides onto the stationary bed rods 144.

As indicated in Figs. 2, 4, 7 and 8, the pivoted, inwardly spring-urged yieldable check flaps 171 and 173 extend into the path of movement of the pan strap as it slides forward and downward upon the bed rods 144, and serve to brake or slow the movement of the pan strap so that there is no excessive impact when the forward edge of the pan strap contacts the stop shoulder 170; thereby reducing wear and failure of both the pan straps and the stop shoulder 170. The reversible and interchangeable check flap face plates 223, being of softer material than the metal of the pan strap, wear out in preference to the pan strap and can be easily replaced.

With the de-lidded pan strap 28 thus resting on the stationary bed rods 144 in rightside-up position (and with the forward edge of the pan strap bearing against the stop shoulder 170), the turn-over mechanism 150 goes into operation. That is, the shaft 152 is rotated (from the power shaft 88 through the crank arm 156, the connecting rod 160 and the crank arm 158) counterclockwise in Fig. 2 to raise the sector-shaped members 162, lifting and turning the pan strap 28 and depositing it, upside-down, on the knockout flaps 225 and 227; the side edges of the pan strap being first slowed by the synthetic resin upper face plates 229 of the inwardly spring-urged check flaps and then coming to rest on the synthetic resin bottom knockout bars 235 with sufficient force to jar the bread loaves loose (but without excessive impact such as might damage the bread loaves or the pan strap) so that the freed loaves fall, upside-down into the generally horizontal bread catcher 204.

Subsequently, the bread catcher 204 is actuated to swing downward (clockwise in Fig. 2) to slightly beyond vertical position enabling the bread loaves to tilt about the bumper bar 212 and fall gently, in rightside-up side-by-side position, upon the idler rollers 214, from which the loaves are shoved by the bumper bar 212 onto the conveyor belt 216 during the upward (counterclockwise in Fig. 2) return swing of the bread catcher 204. Since the spring-urged knockout flaps are located adjacent the open end of the bread catcher (i.e., nearer the bumper bar) and frictionally engage the sides of the bread pan against longitudinal movement, the bread loaves drop into the bread catcher nearer the bumper bar end and hence have only a short distance to shift during downward pivotation of the bread catcher, thereby further reducing likelihood of bread breaking or bruising.

More or less simultaneously with the downward pivotation of the bread catcher 204, lift arms 240 and 242 swing from their horizontal position upwardly (i.e., counterclockwise in Fig. 2) to engage the emptied inverted pan strap 28, raise it off the flaps 225 and 227, and gradually reinvert it so that, when the arms 240 and 242 reach their vertical position (shown in dash-dot lines in Fig. 2), the pan strap tilts and falls by gravity, in rightside-up position, upon the take-off conveyor belt 284. During the return upward (counterclockwise) swing of the bread catcher 204, the arms 240 and 242 also undergo a return swing which moves them downward (clockwise) until both the bread catcher and the lift arms reach their original horizontal positions, wherein they dwell temporarily by reason of the lost motion provided by the connecting rod assembly 182, until the next pan strap is deposited upon the knockout flaps 225 and 227, whereupon the swinging cycle is repeated.

I have found that the use of the check flaps 171 and 173 and the knockout flaps 225 and 227, with their relatively soft interchangeable and removable face plates and knockout bars, very substantially reduces the proportion of bruised or broken bread loaves during the de-panning operation and also appreciably increases the useful life of pan straps by greatly reducing the incidence of damage or injury to the pan strap, and especially the relatively weak spacer elements 34 thereof. There is also considerably less noise and vibration during operation of the machine.

As indicated above, replacement of worn face plates and knockout bars for the flaps 171 and 173 and 225 and 227 can be accomplished quickly, easily and inexpensively.

The present invention may be embodied in other specific forms and, accordingly, the above-described embodiment is to be considered in all respects merely as illustrative and not restrictive; reference being made to the appended claims as indicative of the scope of this invention.

Having thus described my invention, I claim as new and desire to protect by Letters Patent the following:

1. A machine for de-lidding and de-panning a pan strap containing a plurality of bread loaves or the like disposed in side-by-side relationship therewithin and having a separate removable lid fitting over the pan strap with the lid rim extending peripherally about the outside of the pan strap, said machine including a pair of transversely spaced longitudinally extending forwardly and downwardly inclined conveyor flights constructed and arranged to provide underlying support for the sides of the lid rim; a longitudinally extending conveyor flight disposed below and laterally intermediate the first-mentioned conveyor flights and constructed and arranged to provide underlying support for the pan strap, the last-mentioned conveyor flight being forwardly and downwardly inclined at a somewhat steeper angle than the first-mentioned flights; driving means for moving the pan strap and its lid forwardly and downwardly, the pan strap moving along the last-mentioned conveyor flight and the lid moving along the first-mentioned conveyor flights whereby the pan strap drops gradually relative to its lid; means for halting forward movement of the pan strap after it has dropped clear of its lid, while the lid continues to move forwardly beyond the pan strap along the first-mentioned conveyor flights; pivoted means for engaging the underside of the de-lidded pan strap and for tilting the pan strap forwardly and upwardly through an arc of somewhat more than 90 degrees so that the pan strap can fall forward by gravity in generally upside-down position; means for yieldably checking and slowing the fall of the upside-down pan strap; and means for halting the fall of the upside-down pan strap with sufficient impact force to jar the loaves free and to dump them from the pan strap in side-by-side inverted position.

2. A construction according to claim 1 wherein means are provided for re-starting forward movement of the halted de-lidded pan strap, with subsequent means for yieldably slowing and thereafter re-halting the pan strap in position to be engaged by the pivoted inverting means.

3. A construction according to claim 1 wherein the checking and halting means for the upside-down pan strap comprise a pair of opposed pivoted flaps spring-urged to inwardly-inclined position so that they present inclined faces which are contacted and spread apart by the sides of the falling pan strap, the lower edge of each flap being provided with an inwardly directed shoulder or knockout bar, the opposed knockout bars engaging the side edges of the pan strap to halt the fall of the pan strap.

4. A construction according to claim 3 wherein the pan strap is of metal or the like and wherein the knockout bars are removably attached to the flaps and are of a material softer than the metal of the pan strap so that the knockout bars wear out in preference to the metal and can be replaced when necessary.

5. A construction according to claim 4 wherein each knockout bar is reversible so that it can be attached to the flap in a plurality of positions to provide additional wearing surfaces.

6. A construction according to claim 4 wherein each knockout bar is of rectangular cross-sectional configuration and is constructed and arranged to be attached to the flap in any one of four different positions to provide additional wearing surfaces.

7. A construction according to claim 4 wherein the upper surface of each flap is provided with a removable face plate of a material softer than the metal of the pan strap, the two opposed face plates contacting the sides of the pan strap during the checking action, said face plates wearing out in preference to the metal and being replaceable when necessary.

8. A construction according to claim 6 wherein the upper surface of each flap is provided with a reversible removably attached face plate of a material softer than the metal of the pan strap, the two opposed face plates contacting the sides of the pan strap during the checking action and wearing out in preference to the metal of the pan strap; the reversibility of the face plates providing additional wearing surfaces.

9. A construction according to claim 2 wherein a pair of opposed pivoted flaps spring-urged to inwardly inclined position are provided for yieldably slowing the pan strap prior to the rehalting thereof, said flaps presenting inclined faces which are contacted and spread apart by the sides of the moving pan strap.

10. A construction according to claim 9 wherein the pan strap is of metal or the like and wherein the yieldable check flaps are provided with removable face plates of a material softer than the metal of the pan strap, the two opposed face plates contacting the sides of the pan strap during the slowing action, said face plates wearing out in preference to the metal and being replaceable when necessary.

11. A construction according to claim 10 wherein the two face plates can be interchanged on the two check flaps to provide additional wearing surfaces.

References Cited in the file of this patent

UNITED STATES PATENTS

| | | |
|---|---|---|
| 1,524,067 | Troutman | Jan. 27, 1925 |
| 2,609,944 | Nicoletti | Sept. 9, 1952 |
| 2,682,961 | Winfree et al. | July 6, 1954 |
| 2,715,973 | Winfree | Aug. 23, 1955 |
| 2,730,251 | Schutt | Jan. 10, 1956 |